US008106901B2

(12) United States Patent
Li et al.

(10) Patent No.: US 8,106,901 B2
(45) Date of Patent: Jan. 31, 2012

(54) POWER CIRCUIT AND LIQUID CRYSTAL DISPLAY DEVICE USING SAME

(75) Inventors: Zhong-Ru Li, Shenzhen (CN); Han-Chang Chen, Miao-Li (TW)

(73) Assignees: Innocom Technology (Shenzhen) Co., Ltd., Shenzhen, Guangdong Province (CN); Chimei Innolux Corporation, Miao-Li County (TW)

( * ) Notice: Subject to any disclaimer, the term of this patent is extended or adjusted under 35 U.S.C. 154(b) by 561 days.

(21) Appl. No.: 12/380,717

(22) Filed: Mar. 2, 2009

(65) Prior Publication Data

US 2009/0219274 A1 Sep. 3, 2009

(30) Foreign Application Priority Data

Feb. 29, 2008 (TW) ................................ 97107178 A

(51) Int. Cl.
*G06F 3/038* (2006.01)

(52) U.S. Cl. ........................................ 345/211; 345/212

(58) Field of Classification Search ......................... None
See application file for complete search history.

(56) References Cited

U.S. PATENT DOCUMENTS

| | | | | |
|---|---|---|---|---|
| 5,844,373 | A * | 12/1998 | Yao et al. | 315/205 |
| 6,621,235 | B2 | 9/2003 | Chang | |
| 2005/0057468 | A1 * | 3/2005 | Yamamoto et al. | 345/87 |
| 2006/0170640 | A1 | 8/2006 | Okuno | |
| 2007/0109253 | A1 * | 5/2007 | Zhou et al. | 345/102 |

* cited by examiner

*Primary Examiner* — Christopher R Lamb
(74) *Attorney, Agent, or Firm* — Altis Law Group, Inc.

(57) ABSTRACT

A power circuit includes a PWM circuit for generating a pulse wave, a first control signal and a second control signal, a switching mode voltage stabilizer circuit, a first control circuit and a second control circuit. The PWM circuit includes a pulse wave pin, a first control pin and a second control pin. The switching mode voltage stabilizer circuit receives the pulse wave via the pulse wave output pin, and converts an external input voltage into a first direct voltage under control of the pulse wave. The first control circuit receives the first control signal via the first control pin. The second control circuit receives the second control signal via the second control pin and the first direct voltage, and converts the first direct voltage into a second direct voltage.

20 Claims, 3 Drawing Sheets

POWER CIRCUIT AND LIQUID CRYSTAL DISPLAY DEVICE USING SAME

FIELD OF THE DISCLOSURE

The present disclosure relates to power circuits, and more particularly to a power circuit employing a pulse width modulation (PWM) circuit and a liquid crystal display (LCD) device using the same.

GENERAL BACKGROUND

Liquid crystal display devices have been widely used in various portable information products such as notebooks, personal digital assistants (PDAs), and video cameras, because of its portability, low power consumption, and low radiation. A typical LCD device includes an LCD panel, a backlight for illuminating the LCD panel, a backlight control circuit for controlling the backlight, and a power circuit for providing operation voltages to the LCD panel and the backlight control circuit.

Referring to FIG. 4, a typical power circuit for providing power voltages to an LCD device is shown. The power circuit 100 includes an input terminal 101, a first PWM circuit 110, a first switching mode voltage stabilizer circuit 120, a second PWM circuit 130 and a second switching mode voltage stabilizer circuit 140. When the LCD device works, an inputting voltage is respectively applied to the first PWM circuit 110 and the second PWM circuit 130 via the input terminal 101, and therefore a first pulse wave and a second pulse wave are obtained and respectively transmitted to the first switching mode voltage stabilizer circuit 120 and the second switching mode voltage stabilizer circuit 140. The first switching mode voltage stabilizer circuit 120 generates and outputs a first direct voltage according to the first pulse wave. The second switching mode voltage stabilizer circuit 140 generates and outputs a second direct voltage according to the second pulse wave. The first direct voltage is configured to drive a light source of the LCD device, such as light emitting diodes (LEDs). The second direct voltage is configured to drive a liquid crystal panel of the LCD device.

Under consideration of high cost of the PWM circuit, the power circuit 100 needs two PWM circuit 110,130 for respectively driving the light source and the liquid crystal panel of the LCD device. Thus, the costs of the power circuit 100 and the LCD device employing it are high.

What is needed, therefore, is a power circuit that can overcome the above-described deficiencies. What is also needed is an LCD device employing such power circuit.

DETAILED DESCRIPTION

Figure 1:
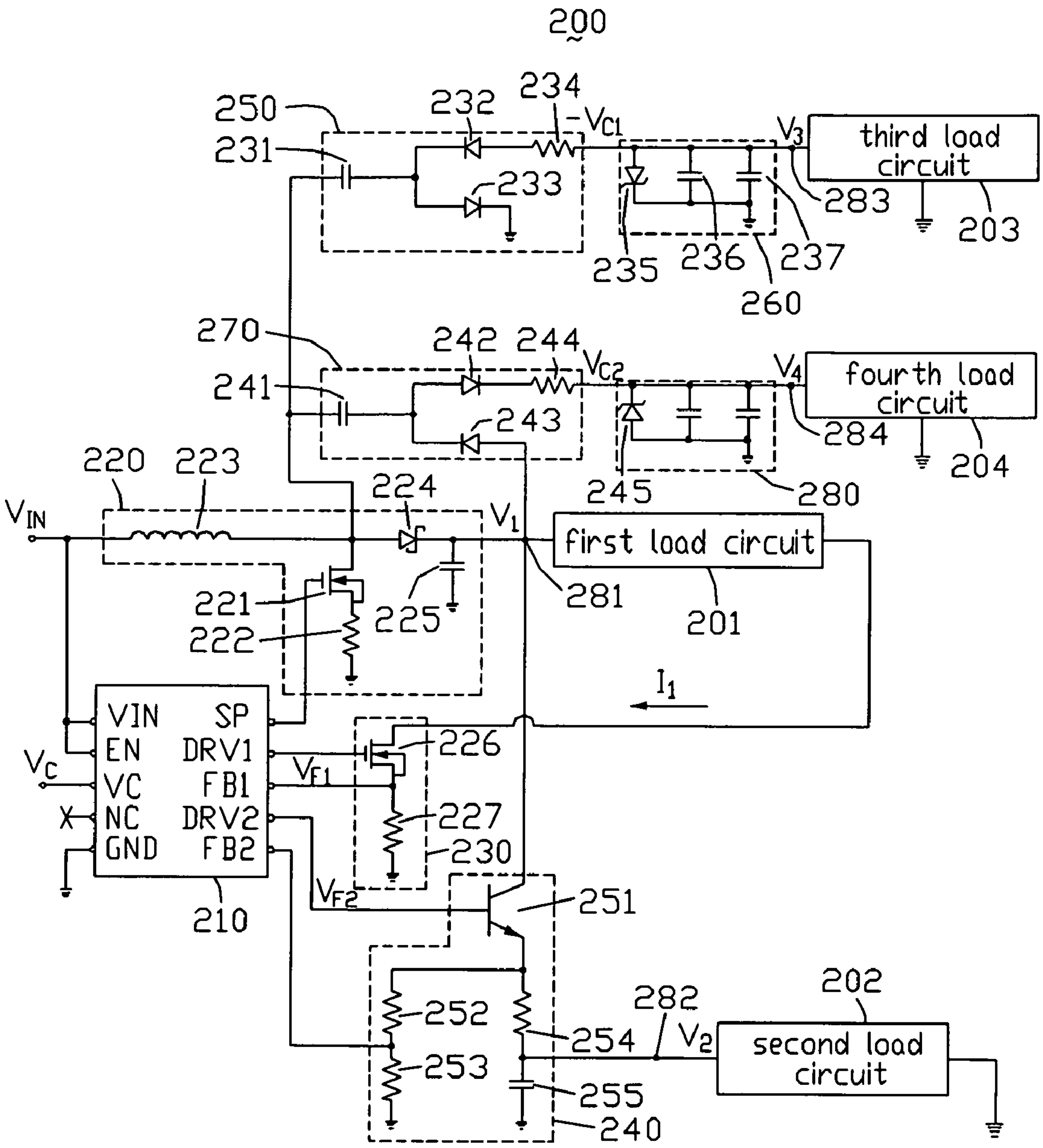
FIG. 1 is a circuit diagram of a power circuit according to a first embodiment of the present disclosure.

Referring to FIG. 1, a power circuit 200 according to a first embodiment of the present disclosure is shown. The power circuit 200 includes a PWM circuit 210, a switching mode voltage stabilizer circuit 220, a first control circuit 230, a second control circuit 240, a first transforming circuit 250, a first voltage stabilizer circuit 260, a second transforming circuit 270, and a second voltage stabilizer circuit 280.

The PWM circuit 210 includes a power input pin VIN, an enable pin EN connected to the power input pin VIN, a signal input pin VC, a ground pin GND connected to the ground, a pulse wave outputting pin SP, a first control pin DRV1, a first feedback pin FB1, a second control pin DRV2, a second feedback pin FB2, and an empty pin NC. The power input pin VIN is configured to receive an external input voltage $V_{IN}$ of the PWM circuit 210. The signal input pin VC is configured to receive a driving signal $V_c$ for driving the PWM circuit 210. The PWM circuit 210 modulates the driving signal $V_c$ to output a pulse wave to the switching mode voltage stabilizer circuit 220 via the pulse wave outputting pin SP. The first control pin DRV1 and the second control pin DRV2 respectively output a first control signal to control the first control circuit 230 and a second control signal to control the second control circuit 240. The first feedback pin FB1 is configured to receive a first feedback signal generated by the first control circuit 230. The second feedback pin FB2 is configured to receive a second feedback signal generated by the second control circuit 240.

The switching mode voltage stabilizer circuit 220 is a boost switching mode voltage stabilizer circuit, and includes a first switching element 221, a first resistor 222, an inductor 223, a first diode 224, and a first capacitor 225. One terminal of the inductor 223 serves as an inputting terminal of the switching mode voltage stabilizer circuit 220 which is connected to the power input pin VIN. The other terminal of the inductor 223 is connected to an anode of the first diode 224, and is connected to ground via the first switching element 221 and the first resistor 222 in series. The first diode 224 is a Schottky barrier diode having a cathode as a first output terminal 281 of the power circuit 220 to provide a first direct voltage $V_1$ to a first load circuit 201, and is connected to ground via the first capacitor 225. The first switching element 221 is a metal-oxide-semiconductor field-effect transistor (MOSFET) having a gate electrode that is connected to the pulse wave outputting pin SP.

The first control circuit 230 includes a second switching element 226 and a second resistor 227. The second switching element 226 is a MOSFET having a gate electrode that is connected to the first control pin DRV1 of the PWM circuit 210 to switch on or switch off the second switching element 226. When the second switching element 226 is switched on, a feedback current $I_1$ generated by the first load circuit 201 can feedback to the first feedback pin FB1 of the PWM circuit 210 via the second switching element 226. The second resistor 227 is connected between the first feedback pin FB1 and ground.

The second control circuit 240 includes a third switching element 251, a third resistor 252, a fourth resistor 253, a fifth resistor 254, and a second capacitor 255. The third switching element 251 is a NPN type bipolar junction transistor. A collector of the third switching element 251 is connected to the first output terminal 281. A base of the third switching element 251 is connected to the second control pin DRV2 of the PWM circuit 210 to switch on or switch off the third switching element 251. An emitter of the third switching element 251 is connected to a terminal of the fifth resistor 254. The other terminal of the fifth resistor 254 serves as a second output terminal 282 to provide a second direct voltage $V_2$ to a second load circuit 202. The second capacitor 255 is connected between the second output terminal 282 and ground. The third resistor 252 is in series with the fourth resistor 253 and is connected between the emitter of the third switching element 251 and ground. When the third switching element 251 is switched on, the first direct voltage $V_1$ can be transmitted to the second feedback pin FB2 via the third switching element 251 and the third resistor 252 sequentially.

The first transforming circuit 250 is a charge pump including a third capacitor 231, a second diode 232, a third diode 233, and a sixth resistor 234. One terminal of the third capacitor 231 is connected to a drain electrode of the first switching element 221. The other terminal is connected to an anode of the third diode 233. A cathode of the third diode 233 is grounded. A cathode of the second diode 232 is connected to the anode of the third diode 233, and an anode of the second diode 232 is connected to the first voltage stabilizer circuit 260 via the sixth resistor 234.

The first voltage stabilizer circuit 260 includes a first stabilovolt tube 235 that is a Zener diode, a fourth capacitor 236, and a fifth capacitor 237. An anode of the first stabilovolt tube 235 serves as a third output terminal 283 of the power circuit 200 to provide a third direct voltage $V_3$ to a third load circuit 203, and is connected to one terminal of the sixth resistor 234. A cathode of the first stabilovolt tube 235 is grounded. The fourth capacitor 236 is connected in parallel with the fifth capacitor 237, and is connected between the third output terminal 283 and ground.

The second transforming circuit 270 is also a charge pump circuit which includes a sixth capacitor 241, a fourth diode 242, a fifth diode 243, and a seventh resistor 244. One terminal of the sixth capacitor 241 is connected to the drain electrode of the first switching element 221. The other terminal is connected to a cathode of the fifth diode 243. An anode of the fifth diode 243 is connected to the first output terminal 281 of the power circuit 200. An anode of the fourth diode 242 is connected to the cathode of the fifth diode 243, and a cathode of the fourth diode 242 is connected to the second voltage stabilizer circuit 280 via the seventh resistor 244.

The second voltage stabilizer circuit 280 has a similar circuit structure with the first voltage stabilizer circuit 260. However, a cathode of a second stabilovolt tube 245 of the second voltage stabilizer circuit 280 serves as a fourth output terminal 284 of the power circuit 200 for providing a fourth direct voltage $V_4$ to a fourth load circuit 204, and is connected to one terminal of the sixth resistor 244. An anode of the second stabilovolt tube 245 is grounded.

An operation of the power circuit 200 is described in detail as follows.

When the external input voltage $V_{IN}$ is applied to the PWM circuit 210, the PWM circuit 200 begins to work. The PWM circuit 210 modulates the driving signal $V_c$ to output a pulse wave to the first switching element 221 of the switching mode voltage stabilizer circuit 220 via the pulse wave outputting pin SP to switch on or switch off the first switching element 221. Simultaneously, the PWM circuit 210 respectively outputs two high levels, for example, a logic 1, to the first control circuit 230 and the second control circuit 240 via the first control pin DRV1 and the second control pin DRV2, to switch on the second switching element 226 and the third switching element 251.

The external input voltage $V_{IN}$ is also applied to the switching mode voltage stabilizer circuit 220, and is converted to the first direct voltage $V_1$ in a boost action of the switching mode voltage stabilizer circuit 220. The first direct voltage $V_1$ is then applied to the first load circuit 201, and therefore the feedback current $I_1$ of the first load circuit 201 is obtained and converted to a first feedback voltage $V_{F1}$ via the second resistor 227 of the first control circuit 230. The first feedback voltage $V_{F1}$ is transmitted to the PWM circuit 210 via the first feedback pin FB1, and is then compared to a first reference voltage signal stored in the PWM circuit 210. When the first feedback voltage $V_{F1}$ is lower than the first reference voltage signal, a duty cycle of the pulse wave output from the PWM circuit 210 is increased, thereby increasing a voltage value of the first direct voltage $V_1$. Otherwise, when the first feedback voltage $V_{F1}$ is higher than the first reference voltage signal, the duty cycle of the pulse wave is decreased, thereby decreasing the voltage value of the first direct voltage $V_1$.

On one hand, because the third switching element 251 is in a switching-on state, the first direct voltage $V_1$ is transmitted to the second control circuit 240, and is divided into the second directed voltage $V_2$ by the fifth resistor 254 connected in series with the fourth capacitor 255. The second directed voltage $V_2$ is applied to the second load circuit 202 via the second output terminal 282. On the other hand, the first direct voltage $V_1$ is also divided into a second feedback voltage $V_{F2}$ by the third resistor 252 connected in series with the fourth resistor 253. The second feedback voltage $V_{F2}$ is transmitted to the second feedback pin FB2 of the PWM circuit 210, and is then compared with a second reference voltage signal stored in the PWM circuit 210. The PWM circuit 210 alters the duty cycle of the pulse wave according to the comparative result, and therefore voltage values of the first directed voltage $V_1$ and the second directed voltage $V_2$ are correspondingly modulated.

In addition, because the first switching element 221 is altered between a switching-on state and a switching-off state in a high-frequency speed under control of the pulse wave output from the PWM circuit 210, the pulse wave is respectively applied to the first transforming circuit 250 and the second transforming circuit 270. The pulse wave is rectified and converted into an inverse direct voltage $-V_{c1}$ by the first transforming circuit 250. The inverse direct voltage $-V_{c1}$ is stabilized by the first voltage stabilizer circuit 260 thereby outputting a third direct voltage $V_3$ to the third load circuit 203 via the third output terminal 283. In the meantime, the pulse wave signal is rectified and gradually stepped up to a positive direct voltage $V_{c2}$ by the second transforming circuit 270. The positive direct voltage $V_{c2}$ is stabilized by the second stabilizer circuit 280 thereby outputting the fourth direct voltage $V_4$ to the fourth load circuit 204 via the fourth output terminal 284.

Because the four direct voltages $V_1$, $V_2$, $V_3$, and $V_4$ that provide corresponding power supplies to the four load circuits 201, 202, 203, and 204 respectively are commonly generated by the PWM circuit 210, the number of the PWM circuit 210 employed by the power circuit 200 is reduced. Therefore, the costs of the power circuit 200 can be cut down.

Furthermore, when one of the power supplies of the first load circuit 201 or the second load circuit 202 is not needed, the high level output by the first control pin DRV1 or the second control pin DRV2 of the PWM circuit 210 needs to be converted into a low level, in order to switch off the second switching element 226 or the third switching element 251. That is, under controlling the output levels of the two control pin DRV1 and DRV2 of the PWM circuit 210, the first control circuit 230 and the second control circuit 240 can respectively determine whether the first direct voltage $V_1$ is applied to the first load circuit 201 and the second load circuit 202. Thus, the power circuit 200 is adaptable to be employed to electrical devices having stand-by status, such as an LCD device.

Figure 2:
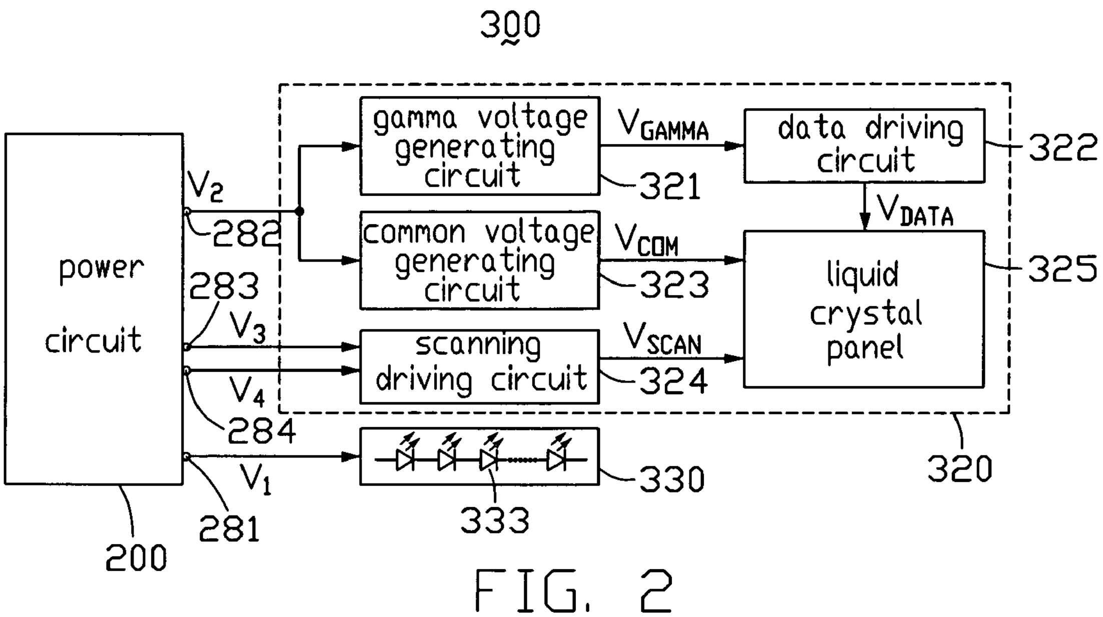
FIG. 2 is a circuit block diagram of an LCD device employing the power circuit of FIG. 1.

Referring to FIG. 2, a circuit block diagram of an LCD device employing the power circuit 200 is shown. The LCD device 300 further includes a liquid crystal module 320 and a backlight module 330 to provide light beams to the liquid crystal module 330. The power circuit 200 is configured to provide various operation direct voltages to the liquid crystal module 320 and the backlight module 330. The liquid crystal module 320 includes a gamma voltage generating circuit 321, a data driving circuit 322, a scanning driving circuit 324, a common voltage generating circuit 323, and a liquid crystal panel 325. The backlight module 330 includes a plurality of light emitted diodes (LEDs) 333 in series with each other.

According requirements of operation direct voltages of the LCD device 300, the power circuit 200 outputs four direct voltages $V_1$, $V_2$, $V_3$ and $V_4$. The first direct voltage $V_1$ is configured to light or power the LEDs 333. The second direct voltage $V_2$ is respectively applied to the gamma voltage generating circuit 321 and the common voltage generating circuit 323. The gamma voltage generating circuit 321 converts the second direct voltage $V_2$ into a set of gamma voltages $V_{GAMMA}$, thereby outputting the set of gamma voltages $V_{GAMMA}$ to the dada driving circuit 322. The data driving circuit 322 generates a plurality of data voltages $V_{DATA}$ to the liquid crystal panel 325 according to the set of gamma voltages $V_{GAMMA}$. The common voltage generating circuit 323 converts the second direct voltage $V_2$ into a common voltage $V_{com}$, thereby outputting the common voltage $V_{com}$ to the liquid crystal panel 325. The third direct voltage $V_3$ and the fourth direct voltage $V_4$ are applied to the scanning driving circuit 324. The scanning driving circuit 324 converts these direct voltages into a scanning voltage $V_{scan}$, thereby outputting the scanning voltage $V_{scan}$ to the liquid crystal panel 325. Liquid crystal molecules of the liquid crystal panel 325 rotate in action of an electric field generated by the common voltage $V_{com}$ and the data voltages $V_{DATA}$.

Because the LCD device 300 only employs one PWM circuit to generate direct operating direct voltages for driving the backlight module 330, the gamma voltage generating circuit 321, the data driving circuit 322, the scanning driving circuit 324, and the common voltage generating circuit 323, the cost of the LCD panel 300 is reduced.

Figure 3:
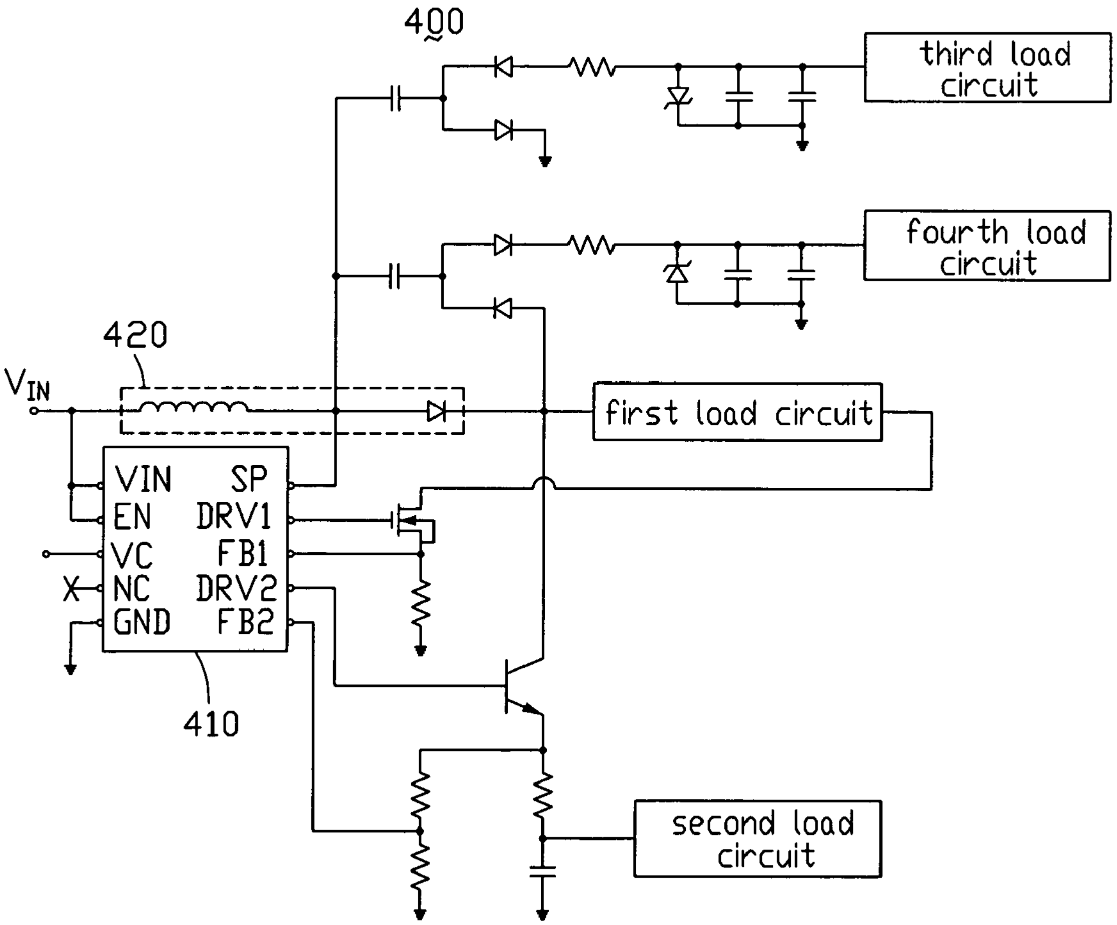
FIG. 3 is a circuit diagram of a power circuit according to a second embodiment of the present disclosure.
Figure 4:
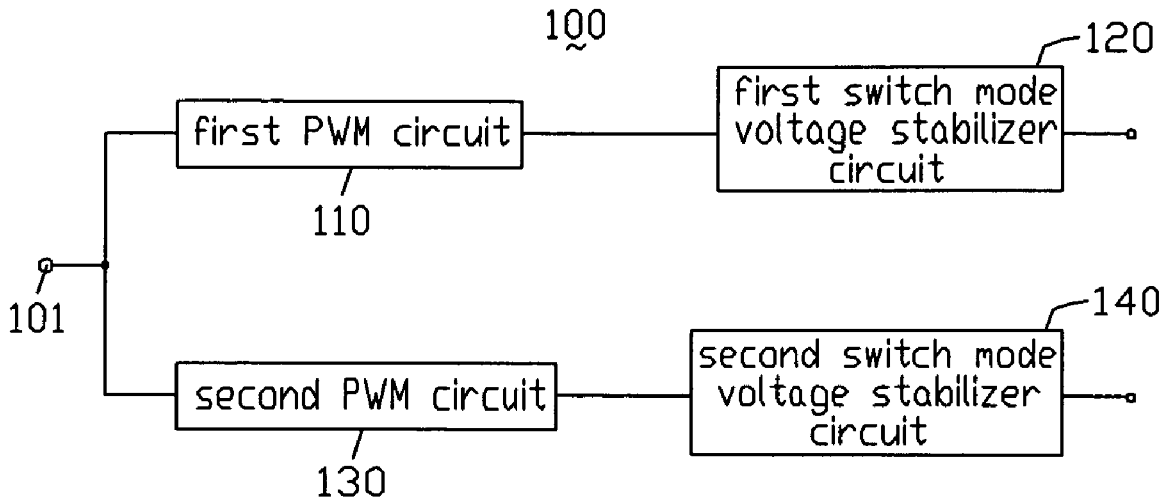
FIG. 4 (RELATED ART)
FIG. 4 is a circuit block diagram of a conventional power circuit employed in an LCD device.

Referring to FIG. 3, a power circuit according to a second embodiment of the present disclosure is shown. The power circuit 400 is similar to the power circuit 200 of the first embodiment. However, a switching element (not shown) and a grounding resistor (not shown) of a switching mode voltage stabilizer circuit 420 are integrated into the PWM circuit 410.

It is believed that the present embodiments and their advantages will be understood from the foregoing description, and it will be apparent that various changes may be made thereto without departing from the spirit or scope of the invention or sacrificing all of its material advantages, the examples hereinbefore described merely being preferred or exemplary embodiments of the invention.

What is claimed is:

1. A power circuit, comprising:

a pulse width modulation (PWM) circuit configured for generating a pulse wave signal, a first control signal, and a second control signal, the pulse width modulation circuit comprising a pulse wave pin, a first control pin, and a second control pin;

a switching mode voltage stabilizer circuit configured for receiving the pulse wave signal via the pulse wave output pin, and converting an external input voltage into a first direct voltage under control of the pulse wave signal;

a first control circuit configured for receiving the first control signal via the first control pin; and a second control circuit configured for receiving the first direct voltage and the second control signal via the second control pin, and converting the first direct voltage into a second direct voltage;

wherein the first control circuit controls whether the first direct voltage is applied to a first load according to a voltage level of the first control signal, and the second control circuit controls whether the second direct voltage is applied to a second load according to an voltage level of the second control signal.

2. The power circuit of claim 1, wherein the PWM circuit further comprises a first feedback pin connected to the first control circuit, wherein a feedback current generated by the first load is feed back to the first feedback pin via the first control circuit.

3. The power circuit of claim 2, wherein the PWM circuit further comprises a second feedback pin connected to the second control circuit, wherein a feedback voltage generated by the second load is feed back to the second feedback pin via the second control circuit.

4. The power circuit of claim 3, wherein the PWM circuit modulates a duty cycle of the pulse wave signal according to the feedback current and the feedback voltage.

5. The power circuit of claim 3, wherein the switching mode voltage stabilizer comprises an inductor, a first switching element, and a first diode, the external input voltage applied to the first load via the inductor and the first diode in order, the first switching element connected between an anode of the first diode and ground, and the pulse wave signal configured to switch on or switch off the first switching element.

6. The power circuit of claim 5, wherein the first switching element is integrated into the PWM circuit.

7. The power circuit of claim 6, wherein the first control circuit comprises a second switching element and a first resistor connected between the first feedback pin and ground, and if the second switching element is switched on under control of the first control signal, the feedback current is feed back to the first feedback pin of the PWM circuit via the second switching element.

8. The power circuit of claim 5, wherein the second control circuit comprises a third switching element and a second resistor, a base of the third switching element connected to the second control pin of the PWM circuit to switch on or switch off the third switching element, a connector of the third switching element receiving the first direct voltage, and an emitter of the third switching element connected to the second load via the second resistor.

9. The power circuit of claim 8, wherein a third resistor connected in series with the fourth resistor is connected between the emitter of the third switching element and ground.

10. The power circuit of claim 9, wherein the second feedback pin of the PWM circuit is connected between the third resistor and the fourth resistor.

11. The power circuit of claim 5, further comprising a first transforming circuit connected to the PWM circuit, the first transforming circuit configured for providing a third direct voltage to a third load.

12. The power circuit of claim 11, wherein the first transforming circuit comprises a first capacitor, a second diode, and a third diode, one terminal of the first capacitor connected to a drain electrode of the first switching element, another terminal of the first capacitor connected to an anode of the second diode and a cathode of the third diode, a cathode of the second diode connected to the third load, and an anode of the third diode connected to ground.

13. The power circuit of claim 11, wherein the first transforming circuit is a charge pump.

14. The power circuit of claim 12, further comprising a first voltage stabilizer circuit connected between the third load and the first transforming circuit.

15. The power circuit of claim 12, further comprising a second transforming circuit connected to the PWM circuit, the second transforming circuit configured for providing a fourth direct voltage to a fourth load.

16. The power circuit of claim 15, wherein the second transforming circuit comprises a second capacitor, a fourth diode, and a fifth diode, one terminal of the second capacitor connected to the drain electrode of the first switching element, another terminal of the second capacitor connected to a cathode of the fourth diode and an anode of the fifth diode, an anode of the fourth diode receiving the first direct voltage, and a cathode of the fifth diode connected to the fourth load.

17. The power circuit of claim 15, further comprising a second voltage stabilizer circuit connected between the fourth load and the second transforming circuit.

18. The power circuit of claim 14, wherein the second transforming circuit is a charge pump.

19. The power circuit of claim 1, wherein the switching mode voltage stabilizer circuit is a boost switching mode voltage stabilizer circuit.

20. A liquid crystal display (LCD) device, comprising:

a liquid crystal module;

a backlight module; and a power circuit configured for providing at least two direct voltages to the liquid crystal module and the backlight module, the power circuit comprising:

a pulse width modulation (PWM) circuit configured for generating a pulse wave signal, a first control signal, and a second control signal, the pulse width modulation circuit comprising a pulse wave pin, a first control pin and a second control pin;

a switching mode voltage stabilizer circuit configured for receiving the pulse wave signal via the pulse wave output pin, and converting an external input voltage into a first direct voltage under control of the pulse wave signal;

a first control circuit configured for receiving the first control signal via the first control pin; and a second control circuit configured for receiving the second control signal via the second control pin and the first direct voltage, and converting the first direct voltage into a second direct voltage;

wherein the first control circuit controls whether the first direct voltage is applied to the backlight module according to a voltage level of the first control signal, and the second control circuit controls whether the second direct voltage is applied to the liquid crystal module according to a voltage level of the second control signal

* * * * *